Oct. 31, 1933.    J. L. ANDERSON    1,933,300
AUTOMATIC CUTTING OR WELDING MACHINE
Filed May 6, 1932    6 Sheets-Sheet 1

INVENTOR
James L. Anderson
BY
ATTORNEY

Oct. 31, 1933.  J. L. ANDERSON  1,933,300
AUTOMATIC CUTTING OR WELDING MACHINE
Filed May 6, 1932   6 Sheets-Sheet 3

INVENTOR
James L. Anderson
BY
ATTORNEY

Oct. 31, 1933.    J. L. ANDERSON    1,933,300
AUTOMATIC CUTTING OR WELDING MACHINE
Filed May 6, 1932    6 Sheets-Sheet 5

INVENTOR
James L. Anderson
BY
ATTORNEY

Oct. 31, 1933.  J. L. ANDERSON  1,933,300
AUTOMATIC CUTTING OR WELDING MACHINE
Filed May 6, 1932    6 Sheets-Sheet 6

INVENTOR
James L. Anderson
BY
ATTORNEY

Patented Oct. 31, 1933

1,933,300

UNITED STATES PATENT OFFICE 1,933,300

AUTOMATIC CUTTING OR WELDING MACHINE

James L. Anderson, Tenafly, N. J., assignor to Air Reduction Company, Incorporated, New York, N. Y., a corporation of New York Application May 6, 1932. Serial No. 609,644

39 Claims. (Cl. 266—23)

This invention relates to cutting or welding machines, and particularly to machines in which a torch is supported for universal movement over a predetermined area.

Many different types of cutting machines have been devised in which the cutting torch is supported for universal movement in a plane, and the area over which the cutting torch operates has been limited by the length and reach of the torch-supporting means.

An object of this invention is to provide a cutting or welding machine in which the torch is supported for universal movement in a plane, and the universal supporting means is connected to a carriage or support which is movable on the frame of the machine to shift or enlarge the area over which the torch operates. This combination makes it possible for the torch to operate over a total area which is much greater than the area determined by the length and reach of the universal supporting means. Another object of the invention is to provide such a machine with power-operated mechanism for moving the carriage, and to make the operation of the mechanism automatic.

When a cutting or welding machine is capable of operating on large pieces of work, it is often necessary to use a crane to move these pieces into and out of position on the work-table. The pieces can be more easily placed and removed by the crane if the work-table of the machine is clear and there are no parts overhanging the table. Although it is necessary to have certain parts of the machine extend over the work during operation of the machine, I have thought to make the overhanging parts movable into a position in which they do not extend over the table.

An object of this invention is to provide a welding or cutting machine having a template holder overhanging the work-table, and to connect the template holder to the frame of the machine by a connection which will permit shifting of the template holder into a position where it will not obstruct the table from above. A more specific object is to provide a template holder which is pivotally connected with the frame of the machine, at one side of the work-table, and movable into a horizontal position for guiding a template follower, and into a vertical or raised position to clear the table when work is to be placed or removed by a crane.

A more particular object of the invention is to provide a cutting or welding machine having a torch supported for universal movement in a plane, and to mount the torch support on a carriage which is movable along a trackway by power driving mechanism, the operation of the power driving mechanism being controlled automatically by the movement of the torch support.

Another object is to provide a power-driven template follower supported by a power-driven carriage, which travels on the frame of the cutting or welding machine to increase the area over which the template follower can operate.

Other objects and advantages of the invention will appear and will be pointed out as the description proceeds.

In the accompanying drawings, forming part hereof:

The frame of the machine comprises leg castings 10 and a track 12, which is secured to the leg castings by bolts 14. Any desired form of trackway may be used, but I prefer to use a straight track made from a standard channel beam. The track may be of any desired length, depending on the size of the pieces which the machine is designed to weld or cut. The frame may be made with as many leg castings as necessary for supporting the track and work.

Figure 2:
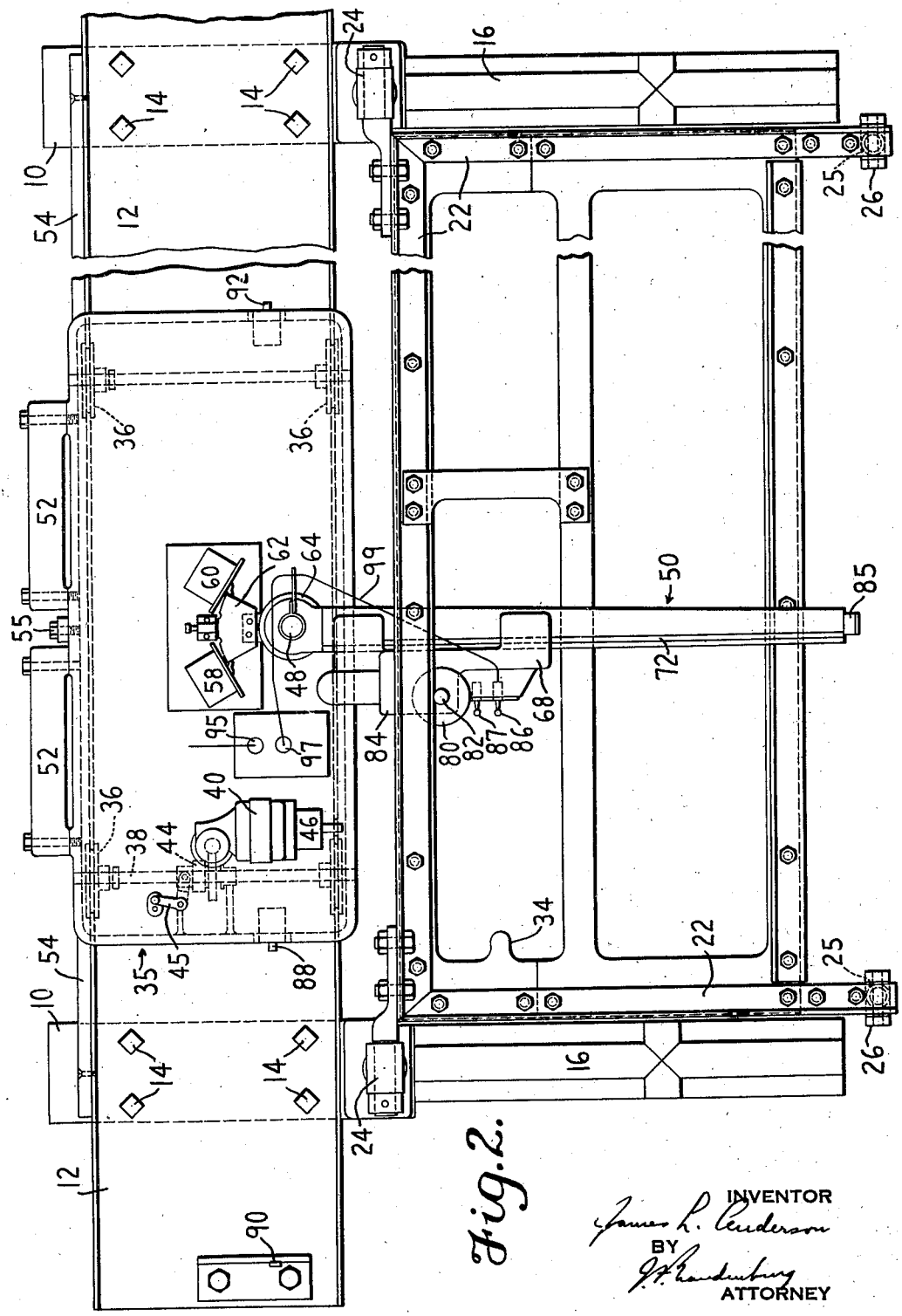
Fig. 2 is a fragmentary top plan view of the machine, with the template holder over the work-table and holding a template in position to guide a follower.
Figure 3:
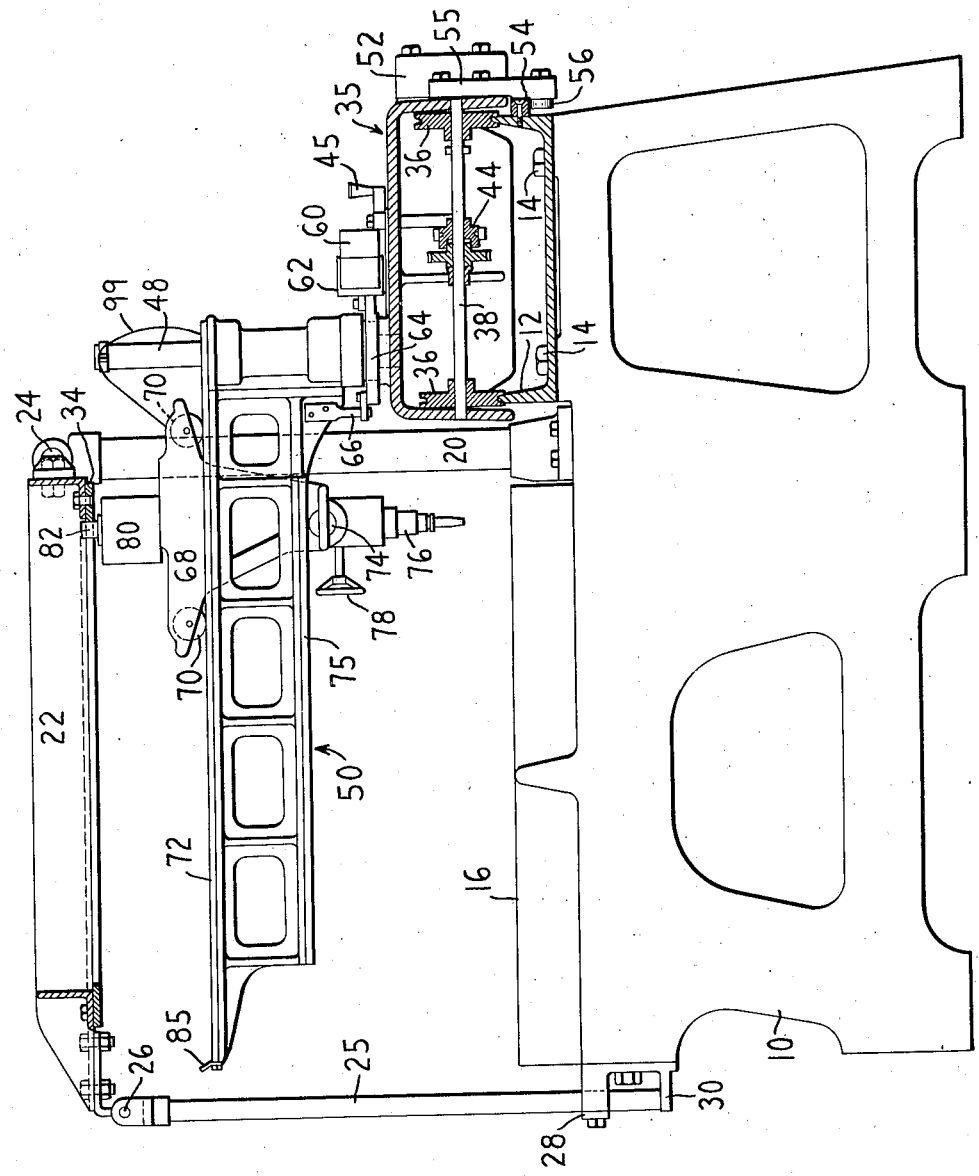
Fig. 3 is an end elevation, partly in section, of the machine shown in Fig. 2.
Figure 4:
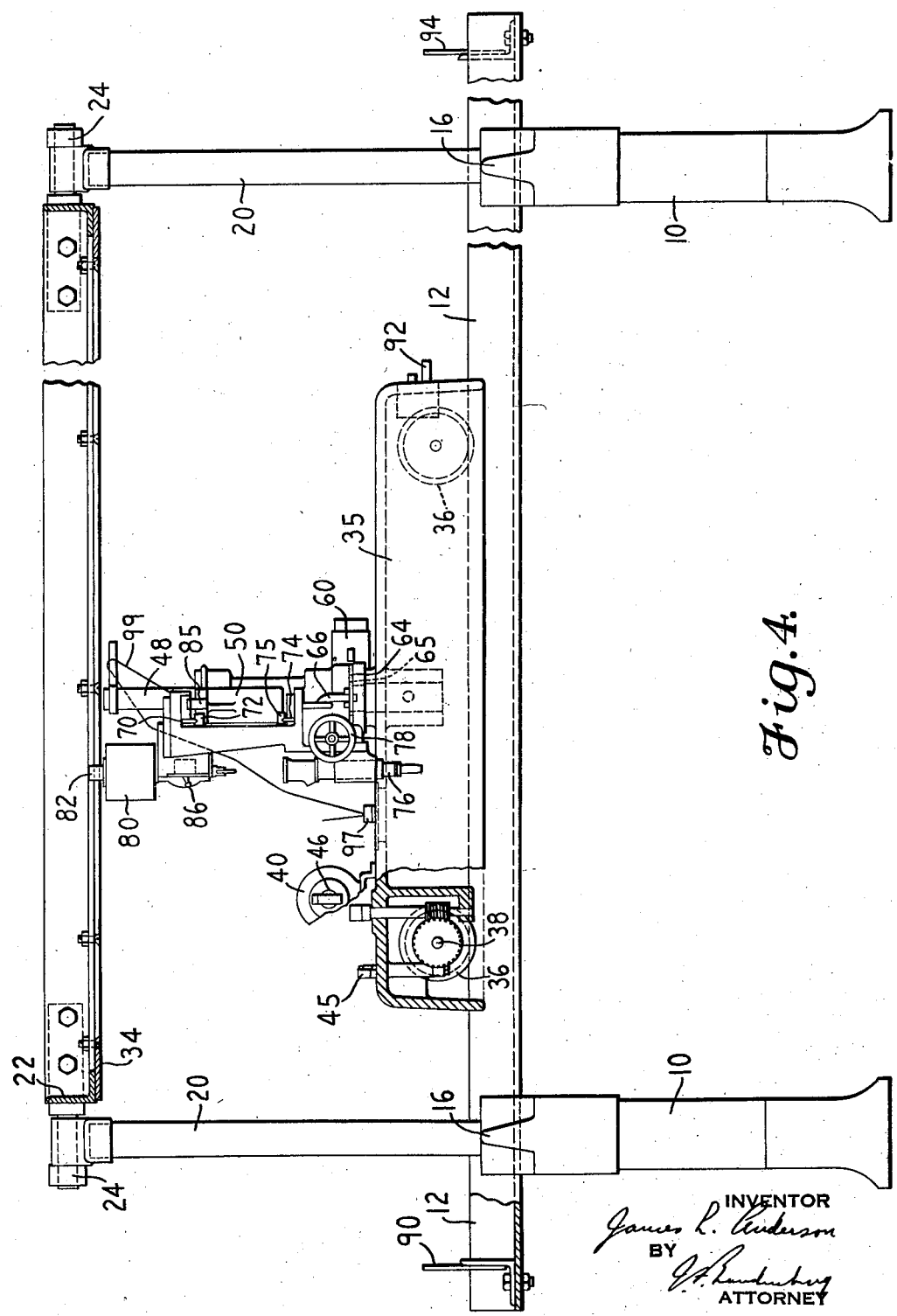
Fig. 4 is a fragmentary front elevation, partly in section, of the machine shown in Fig. 2.

The forward top portions 16 of the leg castings provide a work-table, which has longitudinal supports 18 freely movable on the top portions 16 to accommodate small pieces of work. These longitudinal supports 18 are removed from the machine in Figs. 2–4.

Each of the end leg castings has an upwardly extending pillar 20, and a template holder is pivotally connected with the tops of these pillars. The template holder comprises a frame 22, supported at the back edge by pivotal connections 24 with the pillars 20, and supported at its front edge by supporting bars 25. These supporting bars are pivotally connected with the template holder frame at 26, and fit through guides 28 at the forward ends of the leg castings. The lower ends of the bars 25 rest on bosses 30 formed on the leg castings below the guides 28. A template 34 is shown bolted to the template supporting frame.

A truck or carriage 35 has wheels 36, which fit the track, and the carriage can run along the track from one end of the machine to the other, or as far as necessary for a particular cutting operation. The wheels at one end of the carriage are rigidly connected with an axle 38, which is driven by an electric motor 40 through worm reduction gearing. A clutch 44 is provided for disconnecting the axle from this driving mechanism, and the clutch is engaged or disengaged by a crank handle 45 on the top of the carriage. Any conventional motor, clutch, or reduction gearing may be used. The speed of the motor 40 is controlled by a conventional governor 46. It is not necessary to the invention that the carriage run on wheels. The carriage may slide on the trackway and may be moved along the trackway by a lead-screw, cable, or any known driving mechanism.

An upright post 48 is secured to the carriage 35, and an arm 50 is pivotally supported by the post for oscillation in a horizontal plane. In order to counterbalance the weight of the arm 50 and the structure supported by the arm, counterweights 52 are placed on the back of the carriage. As a further precaution against overturning of the carriage, a flange 54 (Fig. 3) is secured to the back of the track beam and a bracket 55 is rigidly connected with the back of the carriage and provided with a roller 56, which extends under the flange 54. In the ordinary operation of the carriage, the roller 56 does not touch the flange 54, but if a weight strikes the top of the arm 50, or the carriage is otherwise tipped, the roller 56 will contact with the flange 54 and prevent the carriage from turning over.

Figure 1:
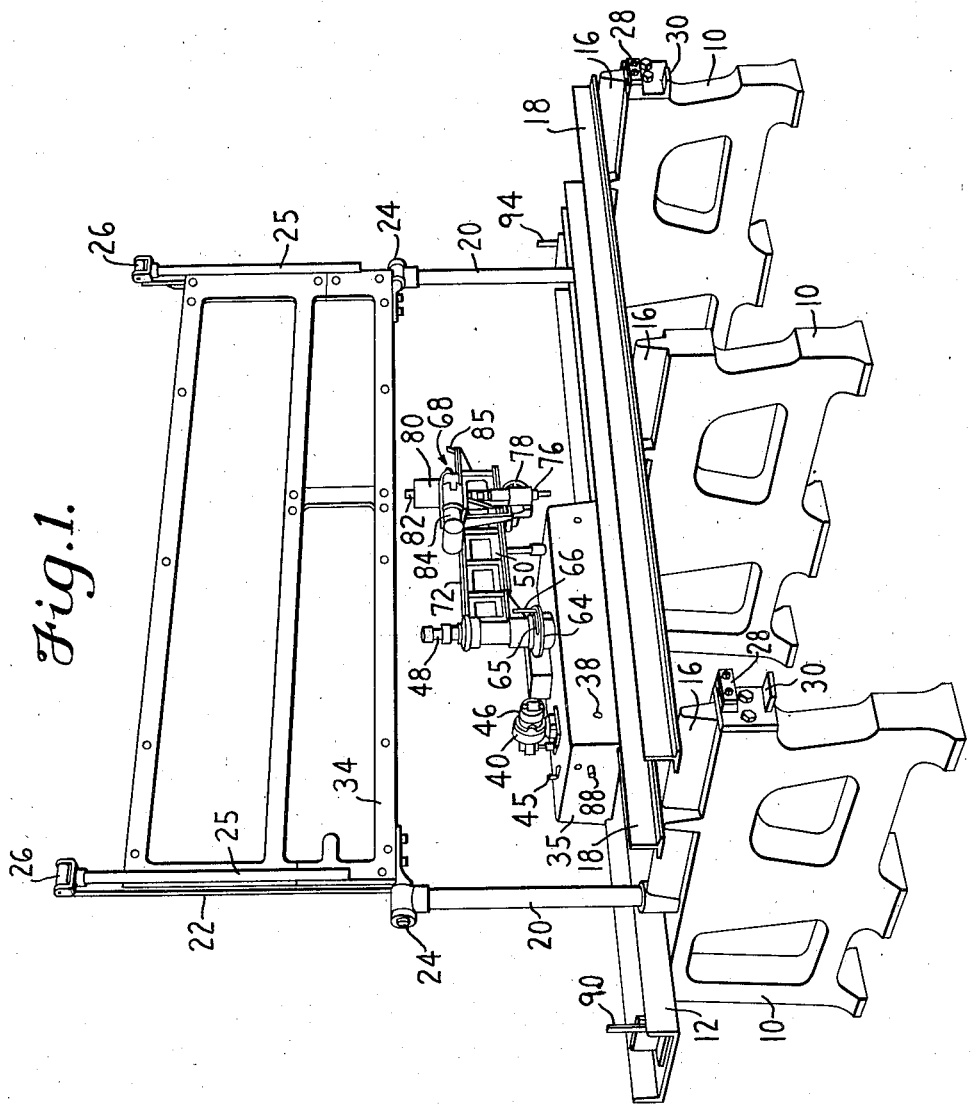
Fig. 1 is a perspective view of a cutting machine embodying my invention, the template holder being shown raised into a vertical position so that the work-table is not obstructed from above.

The motor 40 will operate in a forward or reverse direction to drive the carriage one way or the other along the track. The operation of the motor 40 is controlled by switches 58 and 60, which are conventional double-pole, momentary contact, normally open switches. These switches and their wiring will be explained in the description of Fig. 5. In Fig. 1 these switches are covered by a housing.

The switches 58 and 60 are secured to the carriage 35, and are operated by a switch operator 62, which is pivotally mounted on the post 48. A plate 64 is secured to the forward end of the switch operator 62, and a slot 65 is provided in the plate 64. The radius of this slot is about the axis of the post 48 as a center. A finger 66 is rigidly connected with the arm 50 and extends downwardly through the slot in the plate 64. The finger 66 causes the switch operator to oscillate with the arm 50 and the slot provides a lost-motion in the connection, so that when the direction of oscillation of the arm reverses it will have some angular movement before the finger 66 reaches the opposite end of the slot and starts the switch operator again moving with the arm 50.

A torch-holder 68 is connected with the arm 50. The particular type of connection used is not important, as long as the torch-holder 68 is movable on the arm 50 so that the combined movement of the torch-holder and arm permits universal movement of the torch in a plane over the work while the carriage is stationary. The area over which the torch is universally movable may be shifted to a different part of the worktable by movement of the carriage along the track.

In the embodiment of the invention illustrated, the torch-holder 68 has wheels 70 (Figs. 3 and 4), which run on a track 72 on the top side of the arm 50. The torch-holder has another wheel 74, which runs on a track 75 along the under side of the arm 50. The purpose of the wheel 74 and the track 75 is to balance the side thrust of the torch-holder, since the weight of the torch-holder is almost entirely on one side of the supporting wheels 70.

A torch 76 is carried by the torch-holder and is vertically adjustable on the torch-holder by means of the hand wheel 78 in a well understood manner.

A magnetic tracer 80 is carried by the torch-holder. The magnetic tracer has a rotary tracer member 82, and is driven by a motor 84 through suitable reduction gearing. The rotary tracer member clings to the template as it rolls along the template in the manner described in the Plumley Patent No. 1,352,760, dated September 14, 1920.

A stop 85 is connected with the end of the arm 50, so that the torch-holder can not run off the end of the arm. In the ordinary operation of the machine, however, the torch-holder never reaches the stop 85. This operation will be explained in describing the complete operation of the machine.

Switches 86 and 87 control the supply of power to energize the magnetic tracer 80 and operate the motor 84, respectively.

The invention is not necessarily limited to the magnetic type of tracer. Other types of power-driven tracers are used in universal torch machines, including manually-guided tracers and template-guided tracers, and machines embodying the present invention can be designed to operate with any of these. It should also be understood that it is not necessary to the invention that the torch be supported entirely by the torch-holder. In many known types of cutting machines the weight of the torch is carried largely by a wheel which lies on the work, and this invention may be used with such a support.

When the machine is used for cutting, an oxy-acetylene or oxy-hydrogen torch may be used, or any other gas or thermal cutting instrument. When the machine is used for welding, an oxy-fuel torch, electrical welding device, or any other suitable welding instrument may be connected with the torch-holder.

A limit switch 88 is secured to one end of the carriage 35, and an abutment 90 is connected with the track. When the carriage 35 reaches the end of the track, the switch 88 will contact with the abutment 90 and open the switch, thereby breaking the circuit to the motor 40 and stopping the motor. A limit switch 92 at the right end of the carriage 35 contacts with an abutment 94 at the right end of the track and limits the travel of the carriage in that direction. The limit switches 88 and 92 are normally held closed by springs.

Figure 5:
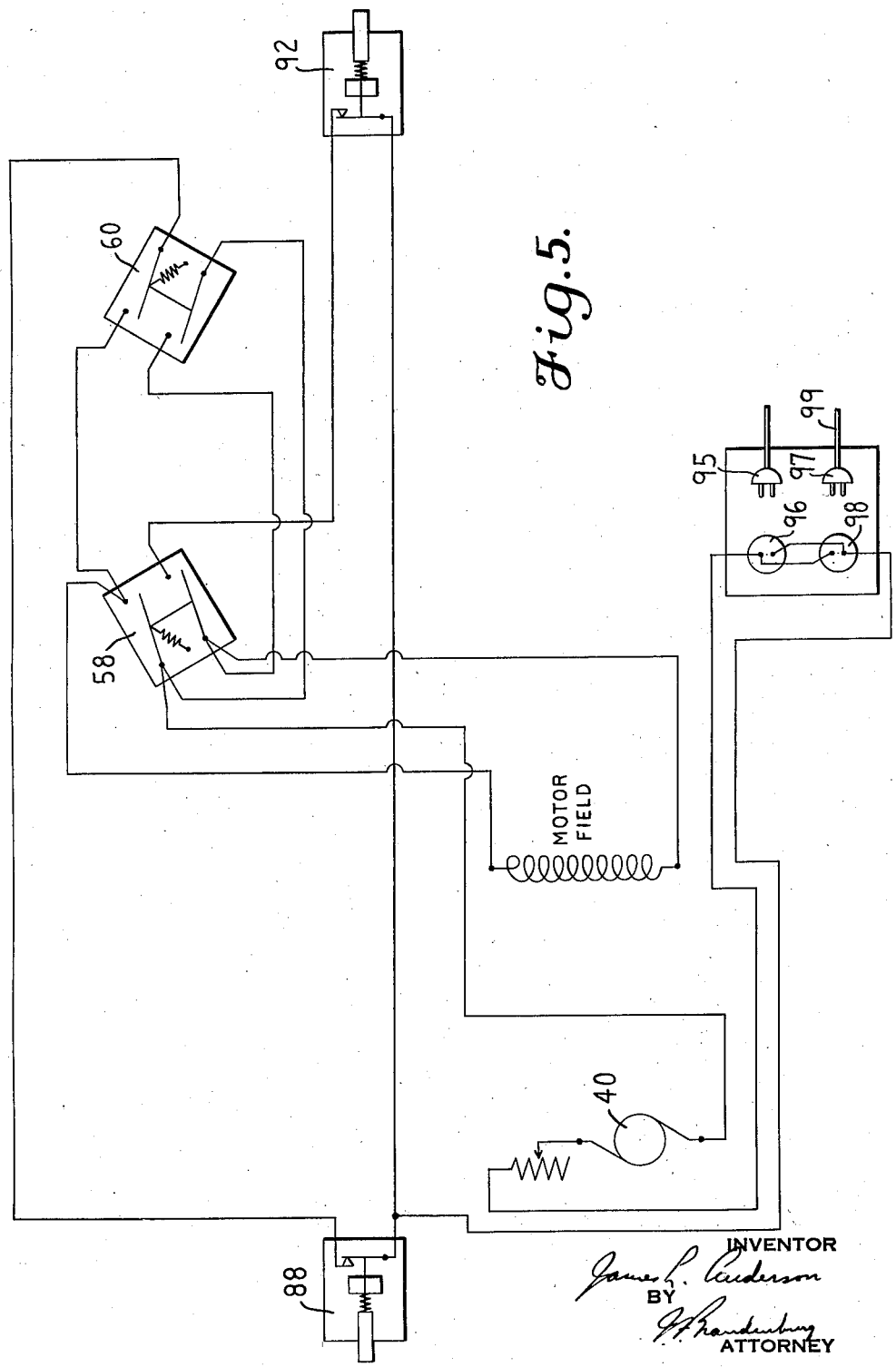
Fig. 5 is a wiring diagram of the carriage driving motor and control switches.

The wiring diagram for the motor 40 is shown in Fig. 5. A plug 95 is connected with a power line and fits a socket 96 in the top of the carriage. From one side of the socket 96 the circuit may be traced through the motor 40, and then through two parallel circuits containing the switches, and back to the other side of the socket 96. In one of the parallel circuits, the switch 58 and limit switch 92 are connected in series, and in the other parallel circuit the switch 60 and limit switch 88 are connected in series. The switches are connected with the motor field, as illustrated, for reversing the direction of rotation of the motor in a conventional manner.

Both of the switches 58 and 60 are normally open, so that no power can flow through the motor 40. When the switch 58 is closed, the motor 40 will operate to drive the carriage to the right in the drawings. If the switch 58 is held closed long enough for the carriage to reach the end of the track, the limit switch 92 will contact with the abutment 94. The carriage will continue to move toward the abutment 94 until the abutment causes the limit switch 92 to open and thus breaks the circuit through the motor 40. The carriage 34 will then remain stationary until the switch 58 is again opened and the switch 60 closed, by the switch operator 62, to operate the carriage in a reverse direction. This operation of the switches 58 and 60 will be more fully explained in describing the complete operation of the machine.

The switches 86 and 87 are connected with the power line through an electric conduit 99 having a plug 97 at the end for connecting with a socket 98. This socket 98 is connected with the power line through the socket 96, as shown in Fig. 5.

The machine can be operated without using the motor 40 to drive the carriage. If the finger 66 is removed, the arm 50 can oscillate about the post 48 without shifting the switch operator 62. The motor 40 will not operate, and if the clutch 44 is disengaged and the carriage 35 rolls easily on the track, the magnetic tracer will have sufficient power to pull the carriage 35 along the track after the torch-holder reaches the stop 82 at the end of the arm 50, and the magnetic tracer can not follow the template any further unless the carriage 35 moves along the track. I prefer to operate the carriage 35 by power, however, and to control the power driving mechanism from the movement of the torch-holder 68 or the arm 50. The use of the power drive for the carriage makes the operation of the machine more positive and limits the angular movement of the arm 50 so that it is not necessary to provide as much clearance for the arm 50 at the ends of the frame of the machine. The power driving mechanism for the carriage also permits the use of a larger and heavier carriage than is possible when the template follower is the only power for moving the carriage.

The complete operation of the machine is as follows:

The template holder frame 22 is raised into a vertical position, as shown in Fig. 1, so that the work may be placed on the table of the machine by an overhead crane. The arm 50 is then moved out over the work-table and the torch-holder is moved to bring the tracer member 82 into a position in which it will be within the template holder frame when the frame is moved into a horizontal position. The template holder frame is then moved into the horizontal position shown in Figs. 2 to 4, and the torch carriage is moved to bring the rotary tracer member 82 into engagement with the template 34. The switches 86 and 87 are operated to energize the magnetic tracer and start the motor 84 for driving the tracer along the template.

The operation and adjustment of the torch will be well understood by those skilled in the art, and no description is necessary in connection with this invention, it being understood that the torch operates over the work along the line of the template followed by the magnetic tracer.

The sequence of operation of the machine during a part of a cutting or welding operation is illustrated in Figs. 6 to 11.

Figure 6:
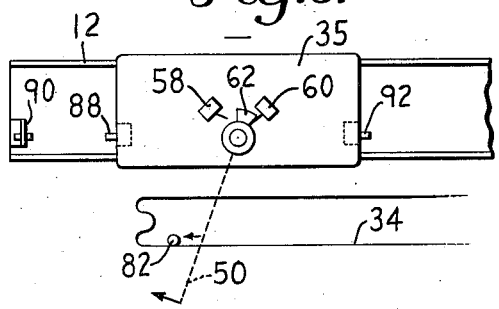
Figs. 6 to 11 are diagrammatic, fragmentary, top plan views showing the sequence of operation of the machine.

In Fig. 6 the carriage 35 is stationary, both of the switches 58 and 60 being in normally open position. The rotary tracer member 82 is rotating in a counter-clockwise direction and moving to the left along the template 34, as indicated by the arrow. This movement of the tracer member will move the arm 50 and switch operator 62 in a clockwise direction. The lost motion connection between the arm 50 and switch operator 62 need not be considered in connection with Figs. 6 to 11. The influence of this lost motion will be explained later.

Figure 7:
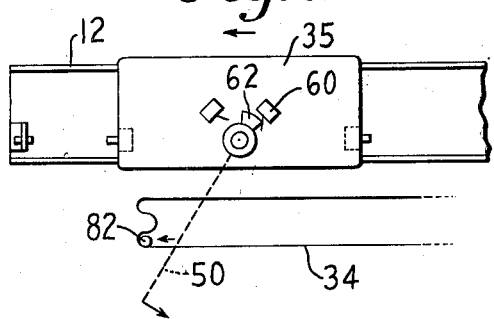

When the rotary tracer member 82 has moved the arm 50 into the angular position shown in Fig. 7, the switch operator 62 will have shifted the switch 60 far enough to cause the switch to snap closed and start the carriage 35 moving to the left. The speed of the carriage 35 is greater than the speed of the rotary tracer member along the template, and consequently the arm 50 will move in a counter-clockwise direction in Fig. 7.

Figure 8:
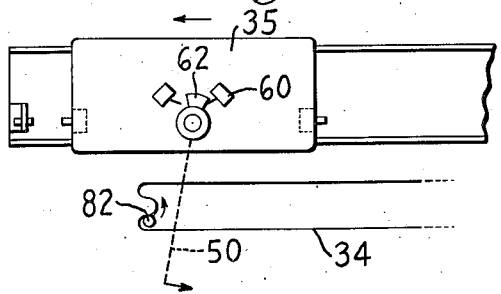

In Fig. 8 the tracer member is moving to the right along the template, thus increasing the rate of counter-clockwise movement of the arm 50. The switch 60 is shown returning to normal position, but it will not snap open until the switch operator 62 moves nearer to mid-position.

Figure 9:
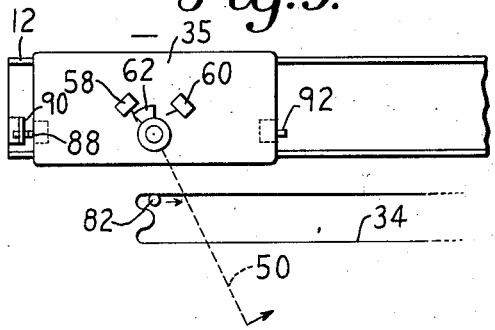

Fig. 9 shows the carriage 35 stopped at the end of the track, switch 88 having been operated by the abutment 90. The tracer member 82 continues to follow the template and the carriage 35 will remain stationary at the end of the track until the arm 50 has been moved in a counter-clockwise direction far enough to snap the switch 58 closed. When the switch 58 is thus snapped closed, the carriage will move to the right, as shown in Fig. 10.

Figure 10:
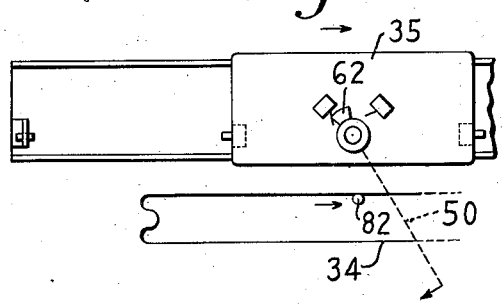

In Fig. 10 the tracer member 82 is moving to the right along the template and the carriage 35 is moving to the right at a greater rate of speed than the tracer member. This difference in speed will cause the arm 50 and switch operator 62 to move in a clockwise direction, so that the arm and switch operator return to approximately their mid-position, shown in Fig. 11. As the arm and switch operator reach the position shown in Fig. 11, the switch 58 will return to normal position and snap open, thus stopping the carriage.

Figure 11:
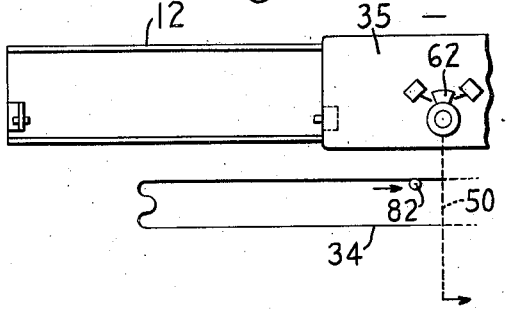

In Fig. 11 the tracer member 82 is moving to the right, and since the carriage 35 is stationary, movement of the tracer member causes the arm 50 to move in a counter-clockwise direction. If the template is long enough the arm 50 will again move into an angular position and start the carriage moving to the right again.

The effect of the lost-motion connection between the finger 68 and the switch operator 62 has been disregarded in describing Figs. 6 to 11. This lost-motion connection does not affect the principle of operation of the switches, but serves to limit the angular movement of the switch operator 62, so that the arm 50 swings through a wider angle during operation of the machine than does the switch operator 62.

The invention has been illustrated in its preferred embodiment, but many changes and modifications may be made without departing from the spirit of the invention as set forth in the appended claims.

I claim:

1. A cutting or welding machine including a frame; a carriage supported by the frame; a torch-holder; means connected with the carriage and torch-holder for supporting the torch-holder for universal movement in a plane with respect to the carriage; and means for intermittently moving the carriage on the frame during a cutting or welding operation to increase the range of universal movement of the torch-holder.

2. The combination of a cutting or welding torch; a carriage; torch-holding means on the carriage for supporting the torch for universal movement in a plane with respect to the carriage; supporting means for the carriage; and means for intermittently moving the carriage on its support during a cutting or welding operation to increase the area over which the torch can travel.

3. A cutting or welding machine including a track; a carriage supported by the track for rectilinear movement along the track; a torch-holder; supporting means for the torch-holder connected with the carriage and supporting the torch-holder for universal movement in a plane with respect to the carriage; and means for intermittently moving the carriage simultaneously with the torch-holder during a cutting or welding operation to increase the range of universal movement of the torch-holder.

4. A cutting or welding machine including a frame; a carriage supported by the frame and movable on the frame; power driving mechanism for moving the carriage on the frame; torch-holding means connected with the carriage and movable with respect to the carriage; and a device operated by movement of the torch-holding means for controlling the operation of the power driving mechanism.

5. A cutting or welding machine including a frame; a carriage supported by the frame and movable on the frame; means connected with the carriage and supporting a torch for universal movement in a plane with respect to the carriage; and control means operated by relative movement of the carriage and the torch-supporting means for controlling the movement of the carriage on the frame.

6. The combination of a cutting or welding torch; a truck; an operating arm carried by the truck and holding the torch for movement with respect to the truck; power driving mechanism for the truck; a trackway along which the truck moves; and control means operated by relative movement of the supporting arm and the truck for controlling the operation of the power driving mechanism.

7. A cutting or welding machine including a frame; a carriage; wheels stably supporting the carriage on the frame for rectilinear movement thereon during a cutting or welding operation; an arm pivotally connected with the carriage; a torch-holder supported by the arm and longitudinally movable along the arm; a motor operatively connected to the carriage wheels; and motor switch means controlled by the position of the torch-holder.

8. A cutting or welding machine including a frame; a carriage; wheels stably supporting the carriage on the frame for rectilinear movement thereon during a cutting or welding operation; a torch-holder pivotally connected with the carriage; a torch carried by a portion of the torch-holder which has universal movement in a plane with respect to the carriage; a motor operatively connected to the carriage wheels; and motor switch means controlled by the position of the torch-holder.

9. The combination of a trackway; a carriage on the trackway; power driving mechanism for moving the carriage along the trackway; an arm pivotally connected with the carriage; a cutting or welding torch connected with the arm; and control means, operated by the angular movement of the arm about its pivotal axis, for controlling the operation of the power driving mechanism.

10. The combination of a track; a carriage on the track; power driving mechanism including an electric motor for moving the carriage along the track; an arm pivotally connected with the carriage; a cutting or welding torch connected with the arm; control means including an electric switch; and a lost-motion connection through which the electric switch is operated by the angular movement of the arm about its pivotal axis for controlling the operation of the electric motor.

11. A cutting or welding machine including a trackway; a carriage on the trackway; power driving mechanism for the carriage; torch-holding means connected with the carriage; control means, operated by movement of the torch-holder, for controlling the power driving mechanism; and auxiliary control means in position to be operated by the carriage, as it approaches the end of the trackway, for stopping the operation of the power driving mechanism.

12. A cutting or welding machine including a trackway; abutments adjacent each end of the trackway; a carriage on the trackway; power driving mechanism for the carriage; torch-holding means connected with the carriage; control means, operated by movement of the torch-holder, for controlling the power driving mechanism; and auxiliary control means, operated by the abutments, for stopping the operation of the power driving mechanism.

13. A cutting or welding machine including a frame; a carriage movable on the frame; a template follower supported by the carriage and movable with respect to the carriage; power mechanism for operating the template follower along a template; and power mechanism for moving the carriage on the frame during a cutting or welding operation, and at a faster speed than the linear speed of the template follower along the template.

14. Cutting and welding apparatus including a track; a carriage on the track; a supporting arm pivotally connected to the carriage; a template follower movable along the supporting arm; power mechanism for moving the carriage along the track during a cutting or welding operation; and power mechanism for operating the template follower along a template at a slower linear speed than the rate of travel of the carriage along the track so that the supporting arm swings away from the direction of travel of the template follower when the carriage and template follower are moving simultaneously in the same direction.

15. A cutting or welding machine including a track; a wheeled carriage on the track; an arm pivotally supported on the carriage on an axis substantially normal to the plane of the track; a torch-holder supported by the arm and movable along the arm; a template follower carried by the torch-holder in position for axial alinement with the torch; a motor for operating the template follower along a template; and another motor on the carriage for driving the carriage along the track at a rate of speed greater than the linear speed of the template follower along the template.

16. The combination of a cutting or welding torch; a torch-holder; a support for the torch-holder on which the torch-holder is movable; a carriage on which the support is movably mounted; flanged wheels on the carriage; a two-rail track on which the flanged wheels run to stably support and guide the carriage; and means for simultaneously moving the torch-holder on its support and the carriage along the track during a cutting or welding operation.

17. A cutting or welding machine including a track; a truck for guiding the carriage; wheels fitting the track and supporting the truck for movement along the track; an arm pivotally connected with the truck; a track on the arm; a torchholder; wheels on the torch-holder supporting it for movement along the arm track; and means for simultaneously moving the torch-holder along the arm and the carriage along the track during a cutting or welding operation.

18. A cutting or welding machine including a frame having a table thereon for holding a piece of work; a track on the frame along one side of the work-table; a truck; wheels fitting the track and supporting and guiding the truck for movement along the track; an arm pivotally connected with the truck for oscillating movement over the work-table; a track on the arm; a torch-holder; wheels on the torch-holder supporting the torch-holder for movement along the arm track; a torch connected with the torch-holder; a template connected with the frame above the torch-holder and arm; and a template follower connected with the torch-holder and operating on the template for moving the torch-holder.

19. A cutting or welding machine including a frame having a work-table thereon; a track on the frame along one side of the work-table; a truck; wheels fitting the track and supporting and guiding the truck for movement along the track; an arm pivotally supported on the truck for oscillating movement over the work-table; a torch-holder supported by wheels for movement along the arm; a torch connected with the torch-holder; a template supported by the frame in a position above the torch-holder; a template follower connected with the torch-holder; and a power mechanism for moving the follower over the template and for moving the torch-holder to propel the torch-holder along the arm and oscillate the arm about its pivotal connection with the truck.

20. A cutting or welding machine including a track; a truck; wheels on the truck and supported by the track; power driving mechanism operatively connected with the truck wheels for moving the truck along the track; an arm pivotally supported by the truck; a torch-holder; rollers on which the torch-holder is supported by the arm for movement along the arm; a power template follower connected with the torch-holder for moving the torch-holder along the arm and oscillating the arm about its pivotal connection with the truck; and control means operated by the oscillation of the arm for controlling the operation of the power driving mechanism.

21. A cutting or welding machine including a frame having a work-table thereon; a track on the frame along one side of the work-table; a truck; wheels on the truck supported by the track; power driving mechanism operatively connected with the truck wheels for moving the truck along the track; an arm pivotally supported on the truck for oscillating movement over the work-table; a torch-holder; rollers on which the torch-holder is supported by the arm for movement along the arm; a template supported by the frame in a position above the torch-holder; a template follower connected with the torch-holder; power mechanism for moving the follower over the template and moving the torch-holder to propel the torch-holder along the arm and oscillate the arm about its pivotal connection with the truck; and control means operated by the oscillation of the arm for controlling the operation of the power driving mechanism of the truck.

22. A cutting or welding machine including a frame; a carriage supported by the frame; electric motor driving mechanism for moving the carriage on the frame; torch-holding means movably connected with the carriage; and an electric switch operated by movement of the torch-holding means for controlling the circuit of the electric motor driving mechanism.

23. A cutting or welding machine including a frame; a carriage supported by the frame; electric motor driving mechanism for moving the carriage on the frame; torch-holding means movably connected with the carriage; an electric switch for controlling the circuit of the electric motor driving mechanism; and a lost-motion connection through which the electric switch is operated by movement of the torch holding means.

24. In a cutting or welding machine; a trackway; a carriage on the trackway; an electric motor and driving mechanism operated thereby for moving the carriage along the trackway; an arm pivotally connected with the carriage; a torch-holder connected with the arm; and an electric switch; operated by the angular movement of the arm about its pivotal axis, for controlling the circuit of the electric motor.

25. In a cutting or welding machine; a track; a carriage on the track; an electric motor and driving mechanism operated thereby for moving the carriage along the track; an arm pivotally connected with the carriage; a torch-holder supported by the arm for universal movement in a plane with respect to the carriage; an electric switch in the circuit of the motor; and a lost-motion connection through which the electric switch is operated by the angular movement of the arm about its pivotal connection.

26. A cutting or welding machine including a trackway; an abutment adjacent the end of the trackway; a carriage on the trackway; electric motor driving mechanism for moving the carriage along the trackway; torch-holding means connected with the carriage; an electric switch, operated by relative movement of the torch-holder and carriage, for controlling the power supply to the electric motor; and an auxiliary electric switch in series with the first-mentioned switch and in position to be operated by the abutment when the carriage approaches the end of the trackway.

27. A cutting or welding machine including a frame; a carriage supported on the frame; power driving mechanism for moving the carriage with respect to the frame; a power driven template follower; a template follower support carried by the carriage; and a control means operated by movement of the template follower support for controlling the operation of the power driving mechanism of the carriage.

28. A cutting or welding machine including a frame; a carriage supported on the frame; an electric motor and driving mechanism operated thereby for moving the carriage with respect to the frame; a template follower; a second electric motor for driving the template follower; an arm carried by the carriage; a torch-holder movably mounted on the arm; the template follower and second motor being carried by the torch-holder; and an electric switch operated by the movement of the template follower for controlling the operation of the carriage-driving motor.

29. A cutting or welding machine including a frame; a carriage supported on the frame; a magnetic template follower; an electric motor for driving the template follower; an arm carried by the carriage; a torch-holder movably mounted on the arm; the template follower and motor being carried by the torch-holder; and switch means on the torch-holder for controlling the circuits of the electric motor and magnetic template follower.

30. A cutting or welding machine including a frame having a work-table thereon; a torch supported for movement over the work-table; a template follower connected with the torch for moving the torch; and a template-holder connected with the frame and extending over the work, the template holder being movable about its connection with the frame into a position in which it does not obstruct the placing and removal of the work by an overhead crane.

31. A cutting or welding machine including a frame having a work-table thereon; torch supporting means movable over the work on said table; a template follower connected with the torch supporting means for driving said torch-supporting means; a template holding frame pivotally connected with the machine frame and supported thereby; the template holding frame being substantially horizontal when in position to hold a template for contact with the template follower, and being movable about its pivotal connection to a substantially vertical position so as not to obstruct the placing and removal of work by an overhead crane.

32. A cutting or welding machine including a frame; a carriage; wheels stably supporting the carriage on the frame for movement thereon during a cutting or welding operation; a torch; torch-holder means connected with the carriage and supporting the torch for universal movement in a plane with respect to the carriage; a tracer connected with the torch-holder means for guiding the torch over the work; and power mechanism for simultaneously operating the tracer and moving the carriage on the frame during the cutting or welding operation.

33. A cutting or welding machine including a frame; a track along one side of the frame; a carriage movable along the track during a cutting or welding operation; wheels supporting the carriage and guiding it along the track; a torch; torch-holder means carried by the carriage and supporting the torch for universal movement in a plane with respect to the carriage; a template; a template follower; and power mechanism for operating the template follower along the template and for intermittently rolling the carriage along the track during the cutting or welding operation.

34. A cutting or welding machine including a frame; a carriage supported by the frame; reversible driving mechanism including electric motor means for moving the carriage on the frame; torch-holding means movably connected with the carriage; and electric switch means operated by movement of the torch-holding means for controlling the operation and the direction of movement of the driving mechanism.

35. In a cutting or welding machine; a track; a carriage on the track; electric motor means and driving mechanism operated thereby for moving the carriage in either direction along the track; an arm pivotally connected with the carriage; a torch-holder connected with the arm; and electric switch means operated by angular movement of the arm in one direction about its pivotal axis for controlling the circuit of the electric motor means to drive the carriage in one direction, and operated by angular movement of the arm in the other direction for controlling the circuit of the electric motor means to drive the carriage in the other direction.

36. A cutting or welding machine including a track; abutments adjacent opposite ends of the track; a carriage on the track; driving mechanism including electric motor means for moving the carriage in either direction along the track; torch-holding means connected with the carriage; electric switch means operated by relative movement of the torch-holding means and carriage for controlling the operation and direction of movement of the driving mechanism; and auxiliary electric switch means in series with the first-mentioned switch means and in position to be operated by the abutments to shut off the supply of power to the electric motor means when the carriage approaches the end of the track.

37. A cutting or welding machine including a frame; a carriage supported on the frame; reversible power driving mechanism for moving the carriage with respect to the frame; a power driven template follower; a template follower support carried by the carriage; and a control means operated by movement of the template follower support for controlling the direction of operation of the power driving mechanism of the carriage.

38. A cutting or welding machine including a frame; a carriage supported by the frame; driving mechanism including a reversible electric motor for moving the carriage in opposite directions on the frame; torch-holding means movably connected with the carriage; and means for controlling the operation and direction of rotation of the electric motor including electric switch means operated by movement of the torch-holding means.

39. In a cutting or welding machine; a track; a carriage on the track; a reversible electric motor and driving mechanism operated thereby for moving the carriage in either direction along the track; an arm pivotally connected with the carriage; a torch-holder connected with the arm; and electric switch means for controlling the operation and direction of rotation of the electric motor, including means operated by the angular movement of the arm about its pivotal axis in either direction to operate the electric motor to drive the carriage in the same direction.

JAMES L. ANDERSON.